United States Patent [19]

Cox

[11] Patent Number: 5,016,853

[45] Date of Patent: May 21, 1991

[54] COLLAPSIBLE SUPPORT DEVICE

[76] Inventor: Jarrell H. Cox, 2207 Irving, Muskogee, Okla. 77403

[21] Appl. No.: 564,028

[22] Filed: Aug. 7, 1990

[51] Int. Cl.$^5$ ............................................. F16M 13/00
[52] U.S. Cl. ..................................... 248/523; 248/174; 248/529
[58] Field of Search ............... 248/519, 174, 523, 524, 248/528, 529, 518, 346, 152; 211/138, 72, 73

[56] References Cited

U.S. PATENT DOCUMENTS

| | | | |
|---|---|---|---|
| 558,433 | 4/1896 | Stoddard | 248/519 X |
| 1,570,403 | 1/1922 | Ripczinske . | |
| 1,906,293 | 9/1929 | Watowski . | |
| 2,053,454 | 3/1936 | Whiteside . | |
| 2,679,371 | 7/1949 | Meldrum . | |
| 2,771,260 | 3/1951 | Thom . | |
| 2,921,692 | 1/1960 | Gilchrist | 248/519 X |
| 3,292,796 | 12/1966 | Paige | 248/174 X |
| 3,297,289 | 1/1967 | Raus | 248/174 X |
| 3,784,136 | 1/1974 | Lopez . | |
| 4,148,455 | 4/1979 | Oliver | 248/158 X |
| 4,222,545 | 9/1980 | Patton | 248/524 |
| 4,544,351 | 10/1985 | Marsicano . | |
| 4,678,149 | 7/1987 | Chase | 248/152 |

FOREIGN PATENT DOCUMENTS 1138218 12/1968 United Kingdom ............... 248/519

Primary Examiner—J. Franklin Foss
Attorney, Agent, or Firm—Head & Johnson

[57] ABSTRACT

A device for supporting a vertical member, such as a Christmas tree, flag pole, candle, or the like, and composed of two or more flat pieces of cardboard, or other foldable material, which are folded and assembled into a support device forming a symmetrical rigid construct when folded.

15 Claims, 3 Drawing Sheets

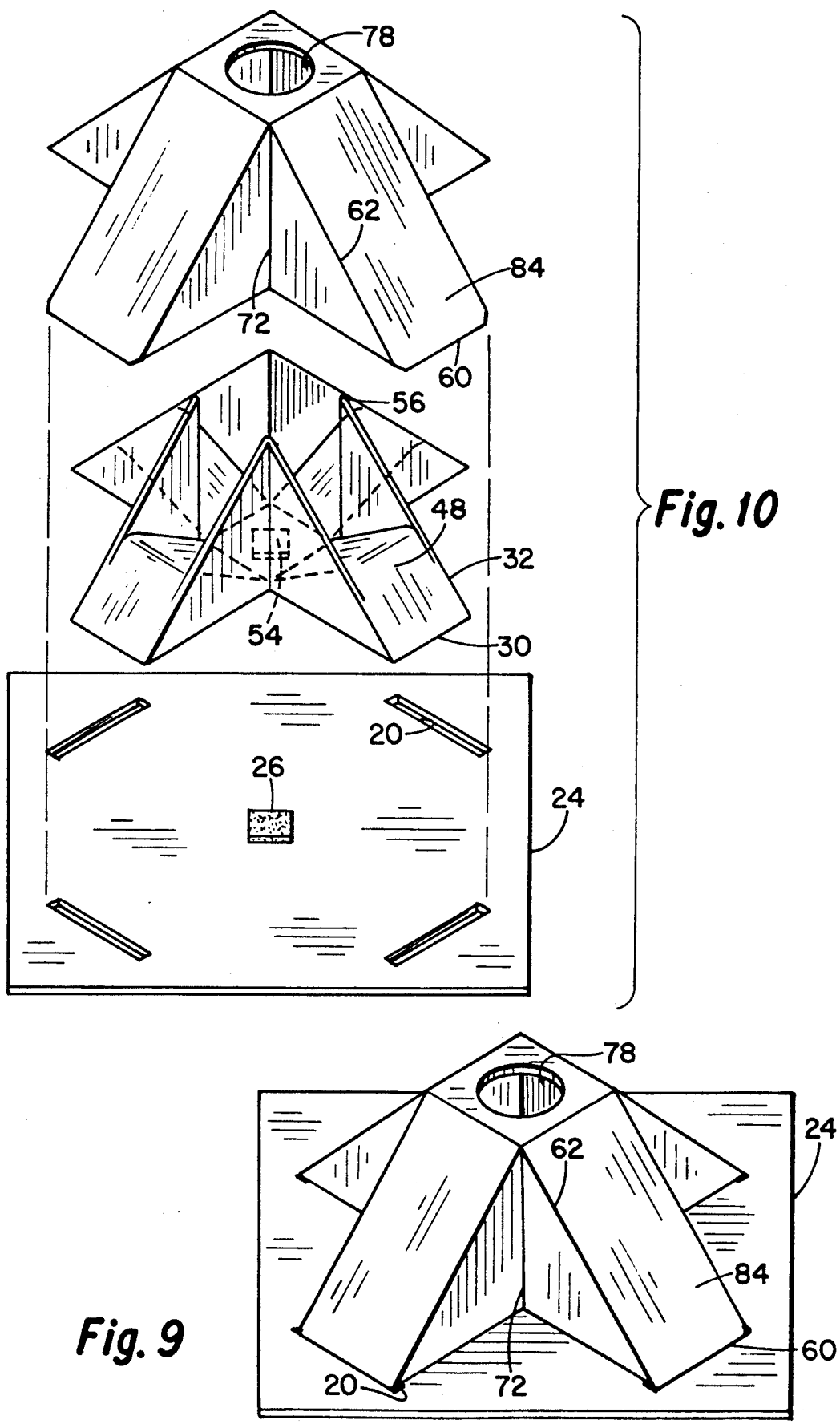

COLLAPSIBLE SUPPORT DEVICE

BACKGROUND OF THE INVENTION

1. Field of the Invention

The present device relates to devices used for supporting vertical members, such as Christmas tree stands, candle holders, flag pole holders, and the like.

Most support devices are make of non-disposable materials, such as metal, ceramics and the like. Most support devices are also bulky, awkward to pack and ship, and may be fragile.

Many support devices, especially Christmas tree stands, require decorative additions, such as a shroud around the stand and tree, and the like. Most devices, which are not assembled, are difficult to assemble, and may require special tools, screws, bolts, extra parts, and the like.

2. Disclosure Statement

The following patents were found in a search:

| | | |
|---|---|---|
| 1,157,403 | 01/26/1926 | Ripczinske |
| 1,906,293 | 05/02/1933 | Watowski |
| 2,053,454 | 09/08/1936 | Whiteside |
| 2,679,371 | 05/25/1954 | Meldrum |
| 2,771,260 | 11/20/1956 | Thom |
| 3,784,136 | 01/08/1974 | Lopez |
| 4,544,351 | 10/01/1985 | Marsicano |

Ripczinske shows a conical metal container which contains water for holding a Christmas tree. Watowski reveals a Christmas tree holder formed of a single sheet of multiply folded cardboard which is formed into a pyramid fastened with rivets. The Whiteside patent is a fireworks tube container made of foldable material, like cardboard, folded to hold a fireworks tube with the construct glued, or otherwise fastened together. Meldrum is another Christmas tree stand which is made of metal, and most of it is not foldable. Thom uses a single sheet of cardboard multiply folded to form a pyramidal Christmas tree stand. Lopez is a manufactured Christmas tree holder, and does not seem applicable to this application. Marsicano reveals a candle holder formed of cardboard, or other such material, that is a single round sheet that fits in a glass or other container to hold a candle.

I believe that the disclosed invention herein is novel and non-obvious.

SUMMARY OF THE INVENTION

This is a novel support device formed by folding sheets of cardboard, or other suitable foldable material, to form a three dimensional structure that can support a Christmas tree, flag pole, candle, or other vertical member.

The preferred embodiment uses three flat sheets of cardboard that have folding indicia inscribed thereon. The three pieces comprise: a bottom flat base piece, a folded inner support piece, and an outer folded piece. There is a central hole or means for inserting the object to be supported, and the assembled holder has a pyramid-like configuration.

It is the object of this invention to provide a cheap, simple to construct, and attractive holder. The use of flat sheets of cardboard allows easy and cheap production, and also facilitates easy flat packaging and handling. Assembly is easy and requires no tools, no other parts, fasteners, glue or the like. The flat sheets may be pre-decorated. The device may be disposable.

BRIEF DESCRIPTION OF THE DRAWINGS

FIG. 9 is an isometric view of the assembled device.

FIG. 10 is an exploded view of the assembled device.

DESCRIPTION OF THE PREFERRED EMBODIMENT

This is a device which is assembled from two or more sheets of foldable material to form a support for a vertical object. The preferred embodiment is used as a Christmas tree stand. However, other uses are envisioned, such as a candle holder, a flag pole holder, and the like.

Figure 1:
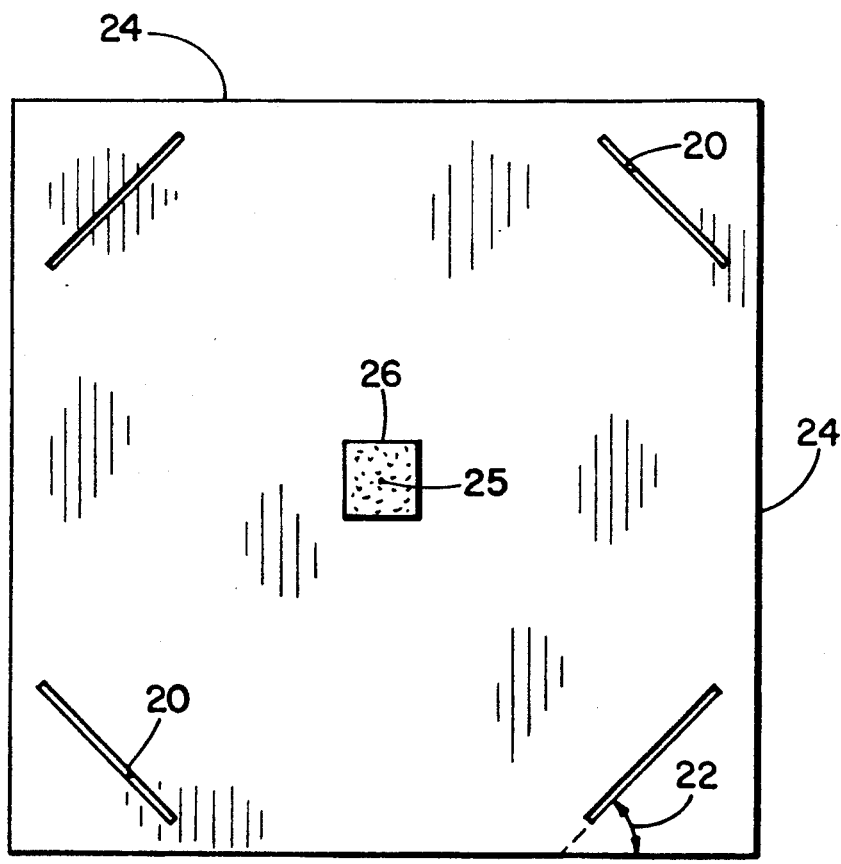
FIG. 1 is a top view of the base member.
Figure 5:
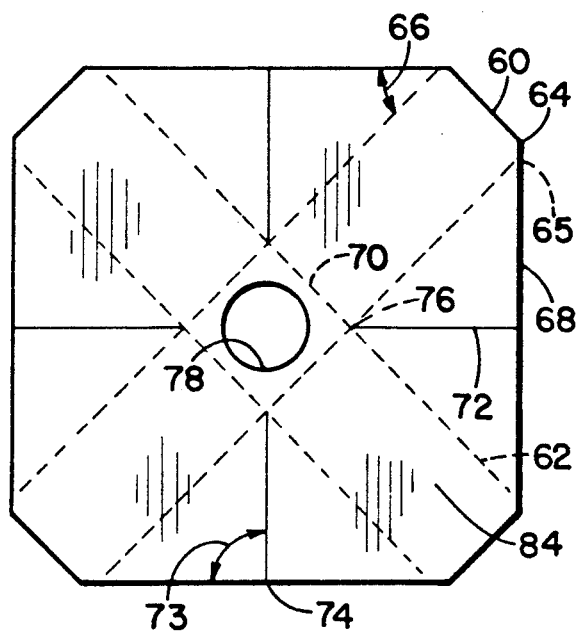
FIG. 5 is a top view of the outer support member before folding, and illustrating a central passage means shown as a preformed hole for insertion of the vertical member to be supported.
Figure 2:
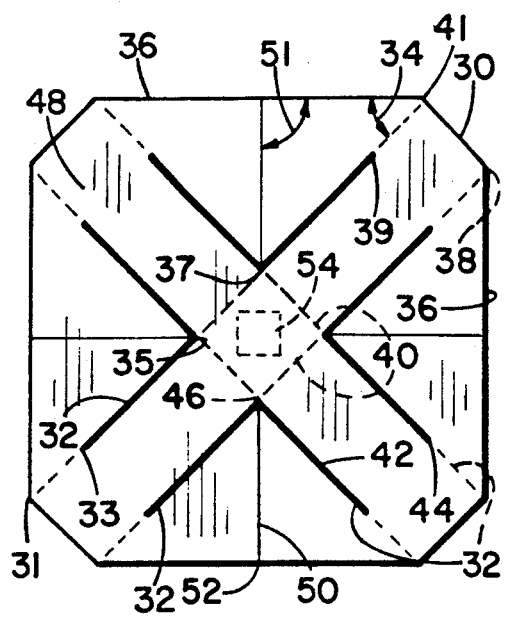
FIG. 2 is a top view of the inner support member before folding.

In the preferred embodiment as a Christmas tree stand, the unassembled device has three flat members: a base member shown in FIG. 1, a foldable inner support member shown in FIG. 2, and a foldable outer support member shown in FIG. 5. A folded and assembled holder is shown in FIG. 9. These members of FIGS. 1, 2, and 5 are preferably made of water-resistant, fire-retardant cardboard. Other foldable materials may be used, such as plastic, metal, other paper products, and the like. The various folding indicia may be made by any available means, such as pressing, punching, stamping, scoring, cutting, perforating, and the like.

The base member as illustrated in FIG. 1 has slots 20 in each corner at forty-five degree angles 22 to the sides 24. The center 25 of the base member has a means for fastening 26 to the inner support member 54 in FIG. 2. These fastening means 26 and 54 may be VELCRO®, adhesive, clips, or other suitable fastening means. I have constructed a model of the preferred embodiment in which the base member of FIG. 1 is a square measuring sixteen inches on each side 24. In this model, each slot 20 measures one-forth inch by four inches; and each slot 20 is ten inches from the center 25 of the base member, as shown in FIG. 1. If larger or smaller versions are made, the various measurements given above and below may be converted to ratios and the resultant measurements used. These measurements are not to be considered as limitations. Additionally, it is noted that the base member of FIG. 1 may be formed in shapes other than a square, such as round, polygonal, and the like, but the slots are still provided.

The flat inner support member is illustrated in FIG. 2. This is square with truncated corners 30. Two pair of folding indicia lines 32 are placed on the member such that each forms a forty-five degree angle 34 in relation to its respective side 36. Each of the lines 32 begins at a point near the edge 38 of the truncated corner 30 and extends to the opposite corner truncation. These two pair of folding indicia lines 32 cross at the center of the inner support member and forms a center square 40. A portion of each indicia line 32 has a section 42 which is cut, perforated, or otherwise tearable or severable. This severable section 42 extends from a point 44 on each indicia line 32 to the corner 46 of the central square 40. The severable sections 42 form bands 48 between them.

Still referring to FIG. 2, one of the lines 32 is labeled to show these segments: segment 31 to 33 is a non-perforate folding indicia, segment 33 to 35 is perforate or severable or cut, segment 35 to 37 is a non-perforate folding indicia and also forms one side of the center square 40, segment 37 to 39 is perforate like segment 33 to 35, and segment 39 to 41 is a non-perforate folding indicia completing the line 32 at the edge 38 of the truncated corner 30. Each of the two pair of lines 32 are so composed. Referring again to this detailed line, the segment 31 to 35 has a non-perforate section 31 to 33 and a perforate section 33 to 35. The perforate section 33 to 35 is approximately two-thirds of the length of the segment 31 to 35. The areas between the perforate sections 33 to 35 form bands 48 when the member is folded. These bands 48 should be of sufficient length for the center square 40 to touch the base member when folded, thus allowing the fastening means 54 on the inner support member to contact and engage the fastening means 26 on the base member shown in FIG. 1.

In the model of the preferred embodiment that I have made, the flat unfolded inner support member of FIG. 2 is a square measuring fifteen and one-half inches on each side 36. The central square 40 is three and one-half inches on each side, and each band 48 is three and one-half inches wide. It should be noted that the inner support member of FIG. 2 is used in the preferred embodiment, however, a device having only the base member of FIG. 1 and the outer support member of FIG. 5 is also functional. As noted for the base member of FIG. 1 above, the dimensions may be varied and are not to be taken as limitations.

The inner support member of FIG. 2 has a second set of folding indicia lines 50 which extend from the center 52 of each side 36 to the nearest corner 46 of the central square 40. Each of these indicia lines 50 forms a ninety degree angle 51 with the side 36. Thus there are four lines 50, one extending from the midpoint 52 of each side 36 to the nearest corner 46 of the center square 40.

Figure 3:
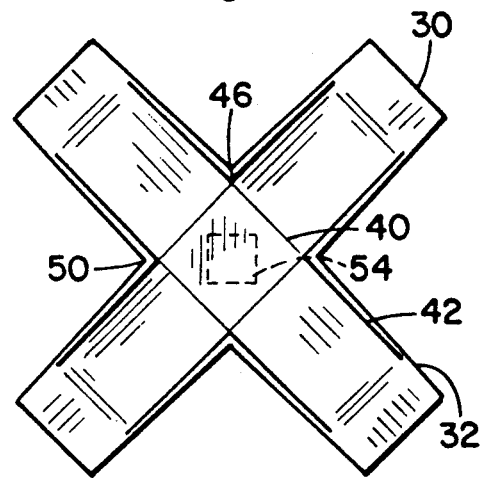
FIG. 3 is a top view of the inner support member after folding.
Figure 4:
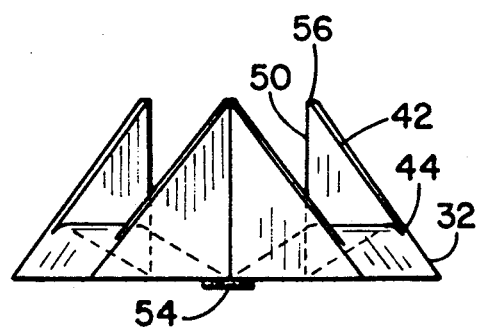
FIG. 4 is a side view of the inner support member after folding.

The folding indicia 32 and 50 of the inner support member, when folded, permit one to obtain the configuration shown in FIGS. 3 and 4. FIG. 3 is a top view of the folded inner support member and shows how it forms a cross-like structure. FIG. 4 is a side view of the folded inner support member and shows the four upward points 56 and a plurality of triangular shapes.

In folding the inner support member shown in FIG. 2, the flat member is held with the surface having the connecting means 54 attached away from the person doing the folding. The four perpendicular lines 40 are folded away from the person and the two sets of parallel lines 32 are folded toward the person. The bands 48 are pushed away from the person, forming a structure as show in FIGS. 3 and 4. The fastening means 54 of the inner support member is then attached to the fastening means 26 of the base member.

The flat unfolded outer support member is illustrated in FIG. 5. This member is square with truncated corners 60 and four sides 68. Two pair of parallel foldable indicia lines 62 extend from a point 65, lateral to the edge 64 of each truncated corner 60, to the opposite corner. These indicia lines 62 are at forty-five degree angles 66 to the sides 68 and form a central square 70 where they cross in the center of the member.

Still referring to FIG. 5, a second set of folding indicia lines 72 extends from the center 74 of each side 68 to the nearest corner 76 of the central square 70. These lines 72 are at ninety degrees 73 to the sides 68.

Figure 6:
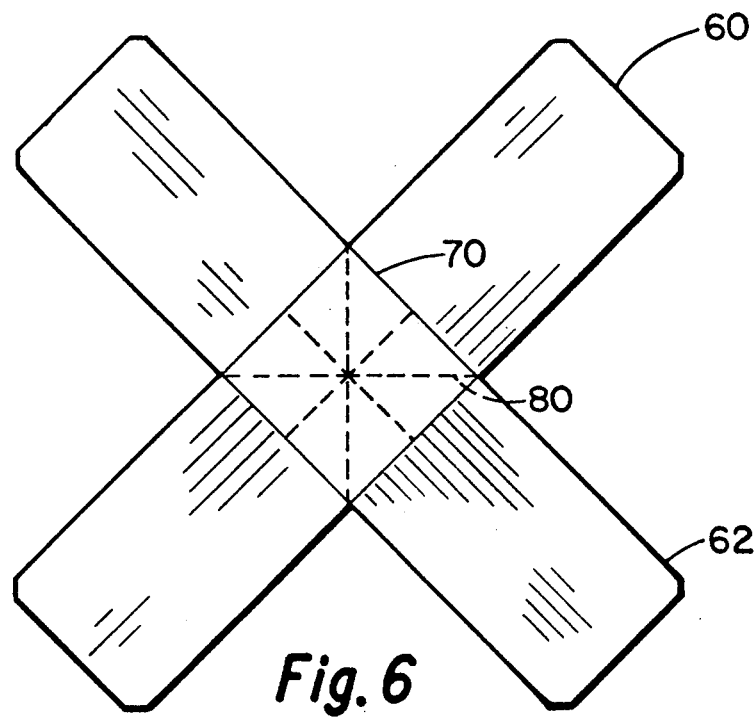
FIG. 6 is a top view of the outer support member after folding, and illustrating a central passage means which is composed of a series of radial perforations which may be torn to receive the vertical object to be supported.
Figure 7:
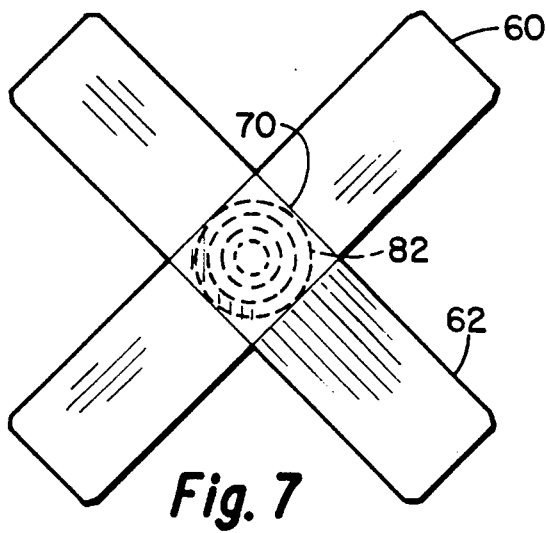
FIG. 7 is a top view of the outer support member after folding, and illustrating a central passage means which is composed of concentric perforations that can be torn to receive the vertical object to be supported.

Within the central square 70 of the outer support member there is a passage means 78 into which the member to be supported is inserted. This passage means 78 may be either a preformed hole as shown in FIG. 5, or a series of radial perforations 80 as seen in FIG. 6, or a series of concentric perforations 82 as illustrated in FIG. 7, or other suitable configurations. It is envisioned that the sides of the passage means 78 will frictionally engage the object to be supported.

In the model that I made, the outer support member as shown in FIG. 5 is a square measuring sixteen inches on a side 68. The distance between the sets of parallel lines 62 forms bands 84 each four inches wide, and the central square 70 is four inches on a side. As stated above, these measurements are not to be taken as limiting.

It should be noted that the sets of folding indicia on the inner support member in FIG. 2 and those on the outer support member in FIG. 5 are similar. However, there is no through cut or perforation in the outer member as there is in the inner member 42, and the outer member is larger, with greater distance between the lines, allowing the folded outer member to fit over the folded inner member.

Figure 8:
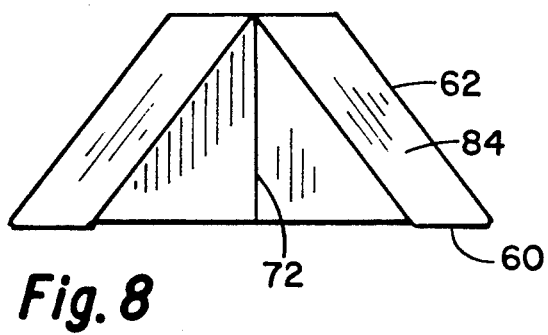
FIG. 8 is a side view of the outer support member after folding.

The outer support member of FIG. 5 is folded much like the inner support member of FIG. 2. Lines 72 are folded away from the person and lines 62 are folded toward the person to produce a structure as in FIGS. 6, 7 and 8. FIGS. 6 and 7 (with different type openings) show top views of the folded outer member forming a cross-shaped configuration. FIG. 8 is a side view of the folded outer member forming ramps and triangles.

The folded outer support member as seen in FIGS. 6, 7 and 8 is placed over the folded inner support member of FIGS. 3 and 4, such that the truncated corners 60 of the outer support member fit within the slots 20 of the base member. The assembled device is shown in FIG. 9 and an exploded view is illustrated in FIG. 10.

The folding indicia lines 32, 50, 62, 72 of the inner support member and of the outer support member may be creases, lines, grooves, perforations or other means for indicating the sites of folding or separation and which may facilitate the folding or separation thereof.

In the Christmas tree model that I made, the base member of FIG. 1 and the outer support member of FIG. 5 were painted red and decorated with decals having a Christmas motif. Other decorative schemes may be used.

It is worth noting that the assembled structure as seen in FIGS. 9 and 10 have numerous triangles in various positions which gives great strength to the device. The model that I constructed withstood in excess of two hundred pounds of weight.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A collapsible support device which comprises:
   a base member;
   an outer flat foldable support member with four corners, a central passage means through which a vertical object may be inserted and which, when folded, forms sloping walls;
   an inner flat foldable support member which when folded leaves an intact center section for supporting and receiving said vertical object, and forming a plurality of upward pointing V-shaped wedges which extend above
   said intact center section and which support said outer support member;
   first means for attaching said inner support member to said base member; and
   second means for attaching said outer support member to said base member.

2. The device, as described in claim 1, wherein said outer and inner support members are square with truncated corners and have folding indicia lines to indicated the sites of folding.

3. The device, as described in claim 2, wherein said folding indicia lines on said inner support member and on said outer support member each consist of two pairs of parallel lines (32, 62) at forty-five degrees to the sides of each member, extending diagonally across said square members, forming a central square (40, 70) where they cross, and a second set of four indicia lines (50, 72) perpendicular to each side and extending from the center of each side to the nearest corner of said central square of each member.

4. The device, as described in claim 1, wherein said first means for attaching said inner support member to said base member is VELCRO.

5. The device, as described in claim 2, wherein said second attaching means includes a plurality of slots in said base member positioned to engage said truncated corners of said folded outer support member.

6. The device, as described in claim 3, wherein said parallel lines on said inner support member are severable from a point (44) about one-third of the way in from each corner (38) to the point where said lines cross (46), and which form four V-shaped projections (46) when folded.

7. The device, as described in claim 3, wherein said pairs of parallel diagonal lines (32, 62) have been folded outwardly, in both said inner and outer support members, and said perpendicular indicia lines (50, 72) have been folded inwardly in both inner and outer members, and said folded inner support member has been secured to said base member and said outer support member has been mounted over said inner support member and fastened to said base member.

8. A collapsible support device which comprises:
   a flat base member having a plurality of spaced apart slots therein;
   a flat substantially square foldable support member with four truncated corners and having a central opening through which a vertical object may be inserted, the foldable support member having folding indicia lines thereon consisting of two sets of parallel lines each extending from a point lateral to the edge of each truncated corner to the like position on the opposite corner at forty-five degree angles to each side so as to form a cross-shaped series of indicia lines with a central square within which said opening is placed, and a second series of folding indicia lines extending from the mid-point of each side of said support member at ninety degrees to said side and extending to the nearest corner of said central square, the truncated corners of the support member when the member is in folded condition being receivable within said base member slots.

9. A collapsible support device according to claim 18 including;
   an inner flat foldable support member which when folded leaves an intact center section for supporting and receiving said vertical object, and forming a plurality of upward pointing V-shaped wedges which extend above said intact center section and which support said outer support member.

10. A collapsible support device according to claim 9 wherein said inner support member is substantially square with truncated corners and has folding indicia lines to indicate the sites of folding.

11. A collapsible support device according to claim 10 wherein said folding indicia lines on said inner support member consists of two pairs of parallel lines at forty-five degrees to the sides of each member extending diagonally across said member and forming a central square where they cross, and a second set of four indicia lines perpendicular to each side and extending from the center of each side to the nearest corner of said central square of each member.

12. A collapsible support device according to claim 9 including:
   means to removably attach said inner support member to said base member.

13. A collapsible support device according to claim 12 wherein said means for attaching said inner support member to said base member is VELCRO.

14. A collapsible support device according to claim 11 wherein said parallel lines on said inner support member are severable from a point about one-third of the way in from each corner to the point where said lines cross and which form four V-shaped projections when folded.

15. A collapsible support device according to claim 11 wherein said pairs of parallel diagonal lines have been folded outwardly, in both said inner and outer support members, and said perpendicular indicia lines have been folded inwardly in both said inner and outer support members, said folded inner support member being attachable to said base member and when folded and attached said outer support member is mountable over said inner support member.

* * * * *